United States Patent [19]

Shikama et al.

[11] Patent Number: 4,823,335
[45] Date of Patent: Apr. 18, 1989

[54] OPTICAL HEAD DEVICE HAVING DEFLECTION MEANS INCLUDING MEANS FOR REDUCING REFLECTED LIGHT ANGLE

[75] Inventors: Shinsuke Shikama; Mitsushige Kondo; Eiichi Tiode, all of Mitsubishi, Japan

[73] Assignee: Mitsubishi Denki Kabushiki Kaisha, Tokyo, Japan

[21] Appl. No.: 103,689

[22] Filed: Oct. 2, 1987

[30] Foreign Application Priority Data

Oct. 21, 1986 [JP] Japan ................. 61-250128

[51] Int. Cl.⁴ ........................... G11B 7/00
[52] U.S. Cl. ........................... 369/112; 369/44; 369/119
[58] Field of Search ................. 369/43–47, 369/109, 112, 117, 119; 358/342

[56] References Cited

U.S. PATENT DOCUMENTS 4,733,065 3/1988 Hoshi et al. ............... 369/112 X
4,734,905 3/1988 Kuwayama et al. ......... 369/112 X Primary Examiner—Robert L. Richardson
Attorney, Agent, or Firm—Oblon, Fisher, Spivak, McClelland & Maier

[57] ABSTRACT

An optical head device comprises a semiconductor laser beam source, a diffraction grating for deflecting a laser beam emitted from the laser beam source at an angle of about 90°, a beam splitter placed between the laser beam source and the diffraction grating, and an objective for converging the laser beam deflected by the diffraction grating on an optical disc.

A surface of the grating is formed at an angle of inclination in the range from 0° to 45° with respect to the central optical axis of the laser beam emitted from the laser beam source so that a reflecting diffraction beam caused by the diffraction grating is used as a deflected beam.

19 Claims, 6 Drawing Sheets (a)

OPTICAL HEAD DEVICE HAVING DEFLECTION MEANS INCLUDING MEANS FOR REDUCING REFLECTED LIGHT ANGLE

BACKGROUND OF THE INVENTION

Field of the Invention

The present invention relates to an optical head device used for an optical system in an optical disc apparatus which optically writes data on a data recording medium and reads out for reproducing the data written on the data recording medium. More particularly, it relates to an optical head device having a reduced thickness which is capable of writing-on, reading-out and erasing of the data on a data recording medium.

DISCUSSION OF THE BACKGROUND

An optical system for an optically recording apparatus is an important unit which reads data on a data recording medium or writes data on the same by converging a laser beam emitted from a laser beam source on the data recording medium by means of a convergent optical device such as an objective.

Recently, thin type compact disc players have been studied and developed as promising audio products in which a light pick-up optical system, IC's and so on are improved. Also, they provide high performance, high productivity and a compact configuration.

FIGS. 10a and 10b show diagrams of the optical system of an optical head used for a conventional optical-recording and reproducing apparatus. More particularly, FIG. 10a is a perspective view showing the arrangement of the elements constituting the optical head system and FIG. 10b is a side view showing the construction of the optical system.

In FIGS. 10a and 10b, a reference numeral 1 designates a semiconductor laser (hereinbelow, referred to as an LD which indicates a laser diode), a numeral 2 designates an outgoing beam from the LD 1 and a numeral 40 designates the central optical axis line of the outgoing beam 2. A beam splitter 3 for dividing a beam incoming therein into a plurality of beams, a collimator lens 4 for providing a parallel light beam and a reflection mirror 5 in a form of a prism having an angle of 45° are arranged along the central optical axis line 40 to transmit the beam. A numeral 6 designates the parallel light beam formed by the collimator lens 4, the light beam having the same cross-sectional area at any point on the central optical axis line 40. An optical element 7 such as an objective having light converging properties gathers the laser beam as a light spot on an optical data recording medium 8 (hereinbelow referred to as an optical disc having a circular plate form which may, however, be an optical card or an optical tape). A numeral 9 designates recording data units (hereinbelow, referred to as pits) formed on the optical disc 8 and a numeral 10 designates a reflected light which is reflected by the surface of the optical disc and then, deflected by the beam splitter 3.

The operation of the conventional optical system will be described. The light beam 2 emitted from the LD 1 is passed through the beam splitter 3 and is formed in a parallel light beam by the collimator lens 4. Then, the beam is deflected by about 90° by the reflection mirror in a prism form having a slope of 45°. The deflected beam enters in the objective 7 to be converged on the surface of the circular optical disc 8. A beam spot formed on the optical disc 8 is subjected to modulation of, for instance, the intensity, phase and an angle of polarization by the pits 9, whereby a reflected light is provided. The light beam is passed through the objective and the other optical elements in the inverse direction. Then, the reflected light is passed through the collimator lens 4 and is reflected at the surface of the slope of the beam splitter 3 to be separated from the outgoing beam 2. The reflected light 10 is then treated by another optical system (not shown) for detecting tracking error signals and focusing error signals which are converted into electric signals by lightdetectors (not shown), whereby data for reproduction, the focusing error signals and the tracking error signals are electrically outputted.

In the conventional optical system, it was necessary for the diameter $d_2$ of the light beam incoming in the objective 7 to have a predetermined value (for instance, the diameter of about 4 mm-5 mm is required for a head for a CD or a VD). Thus, the diameter having the above-mentioned value was essential to keep the numerical aperture (NA) of the light beam focused on the optical disc at a specified value to thereby assure a recording/reproducing system having good frequency properties.

Further, in the conventional optical head, it was y that the diameter $d_1$ emitted from the collimator lens 4 was substantially the same as the diameter $d_2$ to keep a diameter of the beam incoming to the convergent optical element such as the objective as shown in FIG. 10b. Accordingly, the dimensions of the optical elements in the y direction in FIG. 10b were severely limited by an average diameter $d_1$ of the parallel light beam. Namely, the height h of the reflection mirror should be slightly greater than the diameter $d_1$, hence the diameter $d_2$. Also, the diameter of the collimator lens 4 which was usually in a cylindrical form should be slightly greater than the diameter $d_1$. When the beam splitter 3 is arranged in a diverging light beam 2 as shown in FIG. 10b, restriction concerning the dimensions is not so severe in comparison with that for the reflection mirror and the collimator lens. However, the shape of the beam splitter is generally in a cubic form. Since the diameter $d_2$ of the light beam deflected by the reflection mirror 5 and incoming to the convergent optical element is substantially the same as the diameter $d_1$ of the parallel light beam 6 formed by the collimator, the dimension of the optical head device in the y direction in FIG. 10b is primarily determined by a space through which the light beam from the collimator lens is passed. If such dimension is reduced corresponding to the reduced space, this results a great loss of optical properties and causes difficulty in forming a small-sized optical system or miniaturizing an optical head device.

SUMMARY OF THE INVENTION

It is an object of the present invention to provide an optical head device of a thin thickness type by eliminating the problem in the conventional optical system that the diameter of a light beam emitted from an LD is unchanged when it is deflected by 90° by means of reflection mirror.

The foregoing and the other objects of the present invention have been attained by providing an optical head device which comprises a semiconductor laser beam source, a deflection means for deflecting a laser beam emitted from said laser beam source at an angle of about 90°, a first optical means placed between said laser beam source and said deflection means, and a convergent optical element for converging said laser beam deflected by said deflection means on an optical type data recording medium, wherein said deflection means has a surface on which a diffraction grating is formed for reducing the angle of reflection of a light beam impinging on the surface, as compared to the angle of incidence of the light beam, and said surface is formed at an angle of inclination in the range from 0° to 45° with respect to the central optical axis of said laser beam emitted from said laser beam source so that a diffraction beam reflected by said diffraction grating is used as a deflected beam.

In accordance with the present invention, the height in the direction orthogonal to the laser beam emitted from the laser beam source, of each optical element such as the reflection mirror, the collimator lens and so on is reduced by making the diameter of the light beam passed through the collimator lens which is placed at the right angle to the light beam axis of the light beam smaller than the diameter of the light beam incoming to the convergent optical element such as an objective. For this purpose, the function of a reflection type diffraction grating is imparted to the reflection mirror, whereby a respective diffraction beam caused by the reflecting diffraction grating functions as a 90° deflected light beam from the reflection mirror. The above-mentioned means reduces the dimension in cross section of the divergent light beam emitted from the LD in the direction orthogonal to the light beam irrespective of use of the collimator lens.

DETAILED DESCRIPTION OF THE PREFERRED EMBODIMENTS

Preferred embodiments of the present invention will be described with reference to the accompanying drawings.

Figure 1:
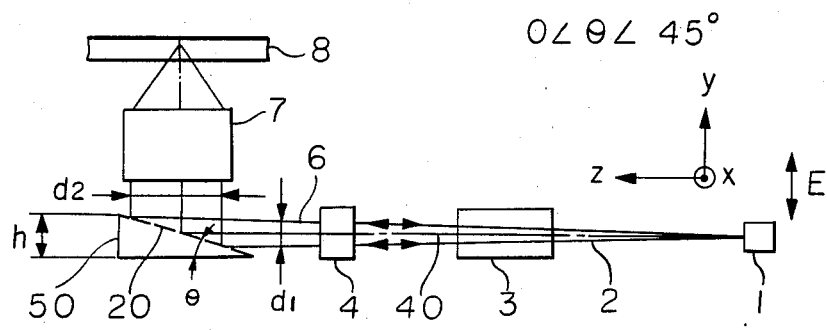
FIGS. 1a and 1b show diagrams of a first embodiment of the optical head device according to the present invention.
Figure 1:
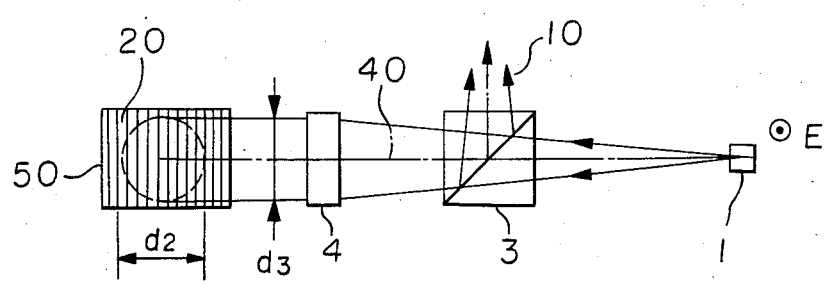
Figure 10:
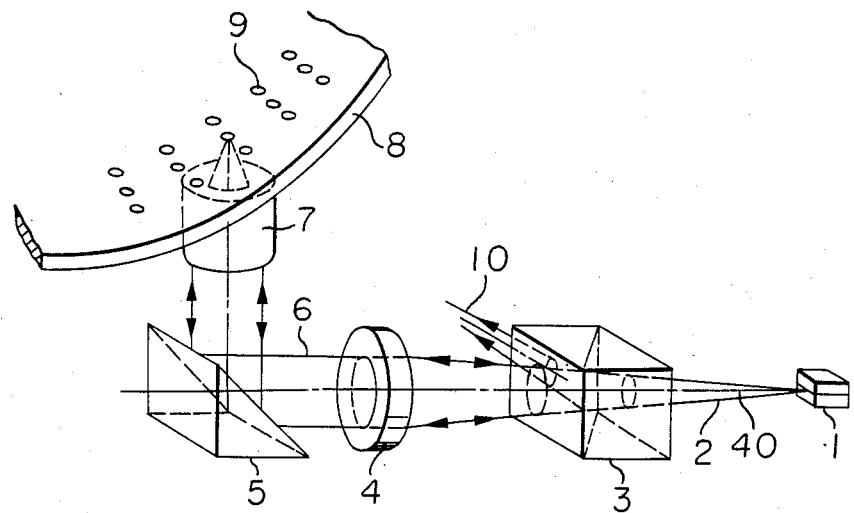
FIGS. 10a and 10b are respectively diagrams showing a conventional optical head device.
Figure 10:
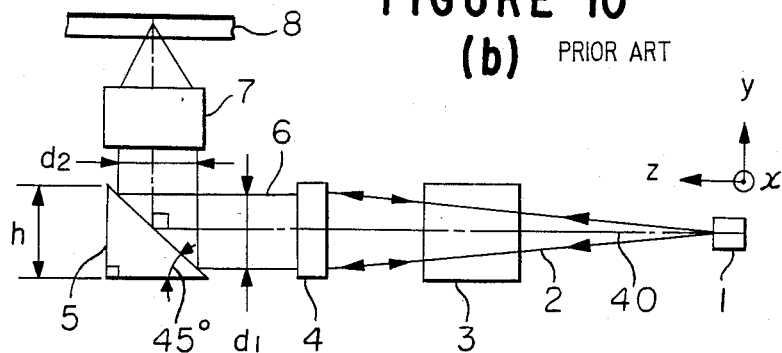

FIGS. 1a and 1b show the first embodiment of the optical head device according to the present invention in which the same reference numerals as in FIGS. 10a and 10b designate the same or corresponding parts. One of the features of the present invention is that the reflection mirror 5 used for the conventional optical device is substituted by a reflection type diffraction grating formed on a prism element 50 having an angle of apex $\theta$ ranging $0 < \theta < 45°$.

A broken line indicates a surface 20 of the prism element 50 on which the diffraction grating is formed. As described in detail hereinbelow, by suitably determining the interval of the grating elements of the diffraction grating, the reflected diffraction beam is deflected by 90° on the grating surface having an inclination angle $\theta$ with respect the light beam coming from the collimator lens. In this case, by selecting the inclination angle $\theta$ at a value of smaller than 45°, the diameter $d_1$ in orthogonal projection of the outgoing light beam from the collimator lens (i.e. the dimension in cross-section of the light beam in the y direction in FIG. 1a) can be smaller than the diameter $d_2$ of the light beam incoming the objective 7. As a result, the height h of the triangular prism element 50 can be reduced in comparison with that in the conventional reflection mirror. Further, the diameter in orthogonal projection of the collimator lens and the height in the orthogonal projection of the beam splitter can be reduced, whereby a thinner type optical head device can be designed.

In the present invention, the diameter $d_1$ of the outgoing light beam from the collimator lens can be reduced without reducing the diameter $d_2$ of the light beam to the objective. Accordingly, there is no reduction of the numerical aperture (NA) of the light beam converged into the optical disc by the function of the convergent optical element 7 such as the objective. Accordingly, the optical system of the present invention has the same recording/reproducing frequency properties as the conventional optical system.

Now, an example of the construction of the reflection type diffraction grating of the present invention will be described.

Figure 2:
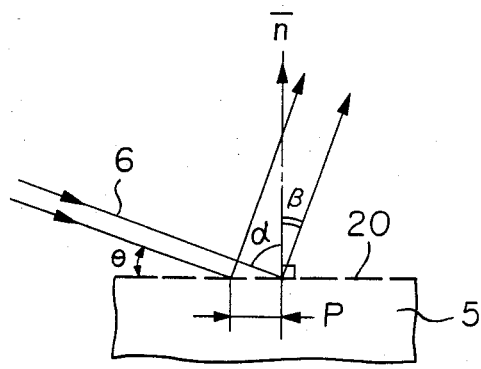
FIG. 2 is a diagram showing a reflection type diffraction grating used for the present invention.

FIG. 2 is a diagram showing a model in which parallel light beam 6 incident to the diffraction grating (having a repetition period (pitch) P of the grating elements) at an angle of incidence $\alpha$ is subjected to reflective diffraction at a smaller angle of $\beta$ with respect to the normal $\bar{n}$ of the surface 20 of the diffraction grating.

As well-known, the following relative equation (1) is established for the angles $\alpha$, $\beta$, the pitch P and the wavelength of light:

$$(\sin \alpha - \sin \beta) = m\lambda \quad (m = 1, 2, 3, 4 \ldots) \tag{1}$$

where m represents orders of diffraction.

The diameter $d_1$ of the light beam from the collimator lens 4 and the diameter $d_2$ of the light beam incoming to the objective 7 are respectively represented by the following equations (2), (3):

$$d_1 = K \cdot P \cos \alpha \tag{2}$$

$$d_2 = K \cdot P \cos \beta \tag{3}$$

where K is a constant.

Accordingly, the following equation (4) is given:

$$d_1/d_2 = \cos \alpha / \cos \beta \tag{4}$$

When the light beam is deflected at the right angle by the diffraction, the following equation (5) is established:

$$\alpha + \beta = \pi/2 \quad (5)$$

When the equation (5) is applied to the equation (4), it is modified as follows:

$$d_1/d_2 = 1/\tan \alpha \quad (6)$$

The inclination angle $\theta$ of the central optical axis line 40 of the light beam from the LD with respect to the grating surface 20 is expressed as follows:

$$\theta = \pi/2 - \alpha \quad (7)$$

Accordingly, the following equation can be obtained from the equation (6).

$$d_1/d_2 = \tan \theta \quad (8)$$

From the equations (1), (5) and (7), the following equation can be obtained:

$$P(\cos\theta - \sin\theta) = m\lambda \quad (9)$$

From the equation (8), the inclination angle $\theta$ with respect to a desired ratio of light beam diameter $d_2/d_1$ is determined. With the inclination angle $\theta$, the pitch P of grating elements is determined by using the equation (9).

In the following, a concrete example is described by using concrete numerical values.

When $d_1/d_2 = \frac{1}{3}$, $\lambda = 0.78$ μm, and m=1 (the first order diffraction beam), there is obtainable $\theta = 18.435°$ from the equation (8) and P=1.233 μm from the equation (9).

Figure 3:
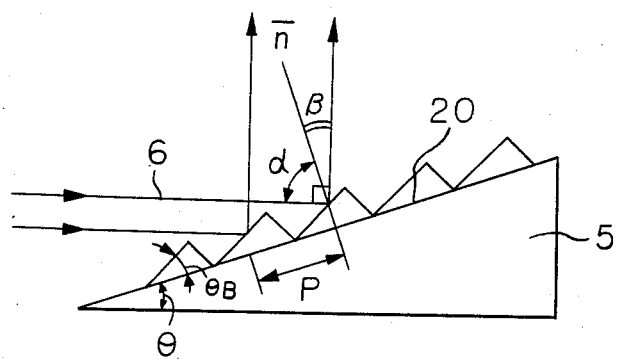
FIG. 3 is a diagram of a first embodiment of the reflection type diffraction grating formed in a saw tooth type.

It is known that the grating surface 20 may be formed in a saw-teeth form as shown in FIG. 3 in order to increase efficiency of diffraction of the first order diffraction beam while reducing the diffraction efficiency of the other orders to thereby effectively utilize an optical power. In FIG. 3, a symbol $\theta_B$ indicates the angle of the saw teeth. When the angle $\theta_B$ and the inclination angle $\theta$ of the grating surface satisfies a relation of $\theta + \theta_B = \pi/4$ (equation 10), the maximum diffraction efficiency of the light beam subjected to reflective diffraction at the right angle can be obtained. For instance, when $\theta = 18.435°$ in the above-mentioned numerical example, $\theta_B = 26.565°$. Thus, when $d_1/d_2 = \frac{1}{3}$, the height of the triangular prism element which constitutes an element corresponding to the reflection mirror, i.e. the reflection type diffraction grating can be reduced to about $\frac{1}{3}$ in comparison with the conventional reflection mirror.

Figure 4:
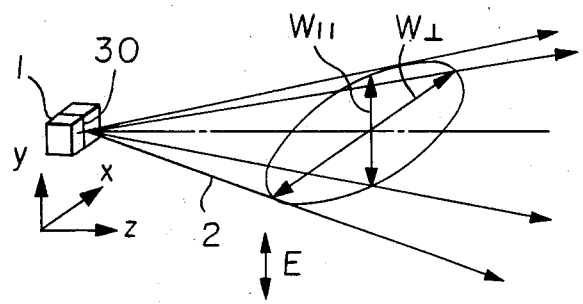
FIG. 4 is a diagram showing a light beam emitted from a semiconductor laser used for the present invention.
Figure 5:
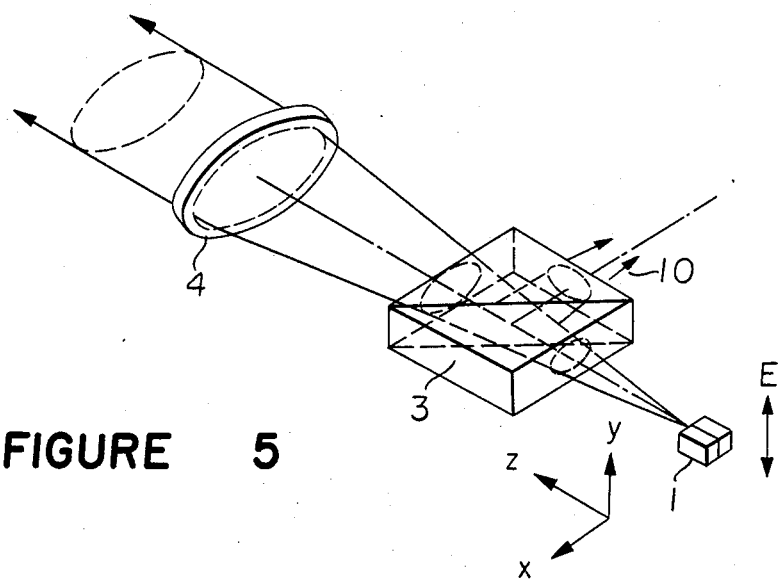
FIG. 5 is a diagram showing the arrangement and the construction of a collimator lens, a beam splitter and an LD used for the thin thickness type optical head device according to the present invention.

FIGS. 4 and 5 show a preferred example of the other structural elements, i.e. the collimator lens 4, the beam splitter 3 and the LD 1.

In the conventional optical system, the shape in cross section of the light beam emitted from the collimator is circular as shown in FIGS. 10a and 10b. However, according to an embodiment of the present invention, the dimension $d_1$ of the light beam in the direction of thickness of the optical head device is smaller than the dimension $d_3$ of the light beam in the direction of width of the optical head device, whereby the shape in cross section of the light beam becomes flat. Accordingly, the shape of the collimator lens 4 may be formed in an oval form by reducing the dimension in height, i.e. in the direction of y in FIG. 5. Thus, the optical head of the present invention can be a thin type one. For instance, when the ratio $d_1/d_2$ is determined to be $\frac{1}{3}$ as described in the above-mentioned numerical example, it is desirable that a ratio of the diameter of the collimator lens in the direction of height (y direction) to the diameter in the direction of width (x direction) is about $\frac{1}{3}$. As to the beam splitter, it is preferable to make it flat by reducing the dimension in the y direction of the beam splitter which has conventionally shaped in a cubic form.

Description will be made as to arrangement of the LD. As shown in FIG. 4, the LD 1 has different dimensions of far-field pattern of the outgoing light beam in the direction parallel to the PN junction interface of a chip 30 and the direction normal to the PN junction interface. When the dimensions of far-field pattern of the outgoing light beam in the direction parallel to and normal to the PN junction interface are represented as $W\perp$ and $W\|$, there is generally a relation of $W\perp > W\|$.

The outgoing light beam from the LD 1 gives a linearly polarized light with respect to the PN junction interface of the chip as indicated by a symbol E in FIG. 4. Since the light beam radiates in an oval form in cross section, it is advantageous that the shorter axis in the oval form, i.e. the direction indicated by E is made coincidence with the direction of thickness (y direction) of the optical head. Namely, the arrangement of the optical elements as shown in FIG. 5 increases transmittance of the light beam and allows effective use of an optical power. For instance, when $W\|$ and $W\perp$ are represented by a power point of $e^{-2}$; they are considered under condition of $W\|/W\perp = \frac{1}{3}$ and the shorter axis and the longer axis of the collimator lens are respectively made coincident with $W\|$ and $W\perp$ as shown in FIG. 5, an approximate value of transmittance of the light beam passing through the collimator lens is 86%. Conversely, when the linearly poralized direction E is made coincident with the longer axis of the collimator lens, the transmittance is 49% which is about half in comparison with the above-mentioned case.

Consideration has to be made as to the case that the collimator lens is not in an oval shape as shown in FIG. 5, but it is nearly circular which diameter being efficiently larger than $W\|$ and $W\perp$. Even in this case, the transmittance of the light beam is determined by the effective diameter of the objective since the light beam from the collimator lens is deflected by the diffraction grating 20 and then, is incident to the objective lens 7 with the dimension emphasized by the reflective diffraction of the grating 20. Accordingly, it is advantageous to obtain a high transmittance by making the direction of E coincident with the direction of the thickness of the optical head device. In the embodiment as shown in FIG. 1a, the direction of polarization of the laser beam emitted from the semiconductor laser is determined to be in coincidence with the direction of thickness of the optical head device. The reason that the ratio $d_1/d_2$ is determined to be $\frac{1}{3}$ is from the fact that LD s having anisotropy ($W\|/W\perp$) in far-field pattern of about $\frac{1}{3}$ have been widely used, and distribution of the light beam incoming to the objective is equalized to thereby improve the transmittance of light beam. However, the similar effect can be obtained by determining the value of $d_1/d_2$ to be other than that value as far as there is a relation of $0 < d_1/d_2 < 1$.

In the above-mentioned embodiment, the optical system in which the diameter of the parallel light beam from the collimator lens is changed, is used. However, the second embodiment of the present invention concerns an optical head device without using the collimator lens.

Figure 6:
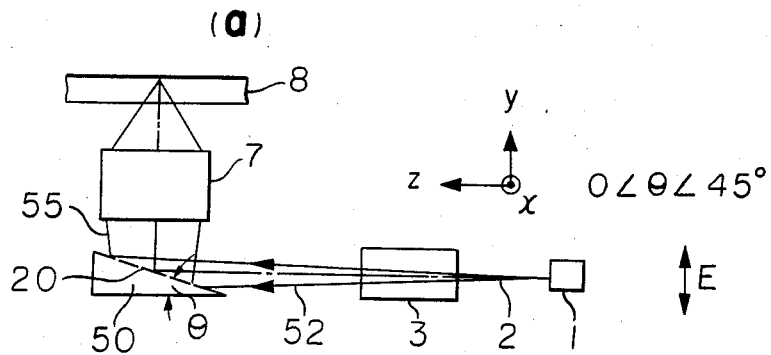
FIGS. 6a and 6b are respectively diagrams of a second embodiment of the optical head device according to the present invention.
Figure 6:
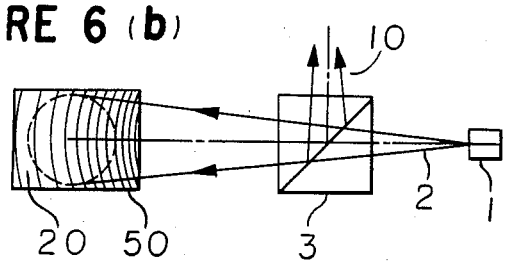

FIGS. 6a and 6b show the second embodiment of the present invention.

The light beam emitted from the LD 1 is deflected by 90° by means of the reflection type diffraction grating formed on the triangular prism element 50 having an inclination angle of $0 < \theta < 45°$, and is incident in the objective 7 to be converged on the optical disc 8.

FIG. 6b is a plane view of the optical head device in which the convergent optical element such as the objective 7 and the optical disc 8 are omitted. The locus of the grating elements of the diffraction grating 20 is curved and each locus of the elements is apart from each other at non-equal distance. It is known that the locus of the grating elements should have interference fringes between a light beams 52 incident to the grating and a light beam 55 deflected by the grating. Accordingly, it is possible to deflect them in the form of a divergent light beam as the case of reflection of the beam 55 by means of a mirror, or it is possible to convert it into a parallel light beam before the reflection. Particularly, when the beam 55 is converted into a parallel beam, the convergent optical element 7 such as the objective can be made to have the specification infinite conjugation. In this case, when focusing and tracking control operations are carried out by a feed-back driving control of the convergent optical element by means of well-known actuator in the direction of the optical axis and the direction orthogonal to the optical axis, there is no deterioration of the function of convergence of the light beam. This is technically advantageous. Further, since the inclination angle $\theta$ is smaller than 45°, an optical head device having the thickness smaller than that of the conventional optical head device using a prism-shaped mirror having an inclination angle of 45°.

In the second embodiment of the present invention, the direction of polarization E of the light beam from the LD should be in the y direction, i.e. the direction in thickness of the optical head device to thereby increase the transmittance of the light beam. The same effect as in the first embodiment can be obtained by the diffraction grating for the second embodiment.

In the first and second embodiments, the beam splitter is formed by bonding two triangular prism elements. However, a flat-plate type beam splitter may be used.

Figure 7:
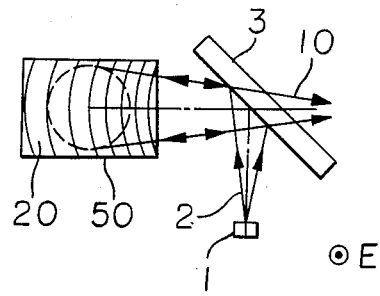
FIG. 7 is a diagram showing a third embodiment of the optical head device of the present invention.
Figure 8:
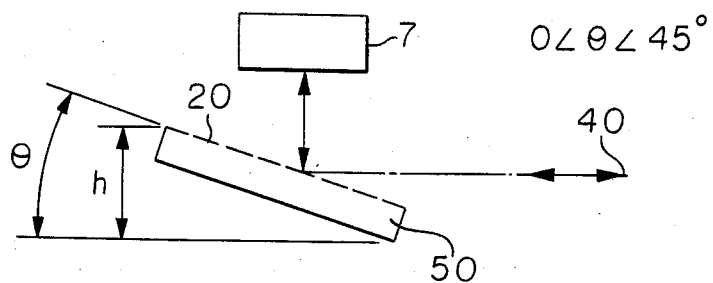
FIG. 8 is a diagram showing a second embodiment of the reflection type diffraction grating in a flat plate form used for the present invention.

FIG. 7 shows the third embodiment of the present invention in which the flat plate-like beam splitter is used; the light beam 2 emitted from the LD 1 is deflected by the beam splitter 3 and is converged on the optical disc. The light beam is reflected by the optical disc and is reversely forwarded on the same optical axis to the beam splitter 3. The light beam is passed through the beam splitter to be received by sensors and a signal reproducing optical system.

Thus, in the third embodiment, a thin thickness type optical head device can be formed by reducing the inclination angle $\theta$ of the diffraction grating to be smaller than 45°.

In the first to third embodiments, the diffraction grating 20 is formed on the slope of the triangular prism element 50. However, the thickness of the optical head device can be reduced by reducing the thickness of the plate-like optical element to assure the same function as the case using the triangular prism element.

Figure 9:
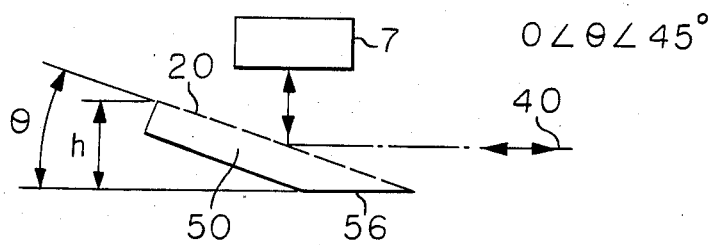
FIG. 9 is a diagram showing a third embodiment of the reflection type deffraction grating of the present invention.

By forming a chamfering portion 56 at the lower part of the flat-plate-like optical element 50 as shown in FIG. 9, the same function as the case that the diffraction grating is formed on the triangular prism element can be obtained regardless of the thickness of the flat-plate-like optical element.

Thus, in accordance with the optical head device of the present invention, the reflection type diffraction grating to reflect the light beam emitted from the LD toward the convergent optical element such as the objective is used; the inclination angle $\theta$ of the diffraction grating surface is determined to be $0 < \theta < 45°$ with respect to the central optical axis of the light beam, and the dimension in orthogonal projection in the direction of thickness of the optical device of the light beam incident in the reflection type diffraction grating is expanded after subjecting to the reflective diffraction. Accordingly, the thickness of the optical head device can be reduced.

What is claimed is:

1. An optical held device which comprises:
   a semiconductor laser beam source,
   a deflection means for deflecting a laser beam emitted from said laser beam source at an angle of about 90°,
   a first optical means placed between said laser beam source and said deflection means, and
   a convergent optical element for converging said laser beam deflected by said deflection means on an optical type data recorded medium, wherein said deflection means has a surface on which is formed a means for causing said laser beam impinging on said surface at an angle $\alpha$ with respect to a normal to said surface to be reflectively diffracted from said surface at an angle $\beta$ with respect to the normal, wherein $\beta < \alpha$ and said means for causing comprises a reflecting diffraction grating, and wherein said surface is formed at an angle of inclination in the range from 0° to 45° with respect to the central optical axis of said laser beam emitted from said laser beam source so that a diffraction beam reflected by said diffraction grating is used as a deflected beam.

2. The optical head device according to claim 1, wherein said deflected beam is a first order reflective diffraction beam.

3. The optical head device according to claim 1, wherein said reflecting diffraction grating has a sawteeth-like surface in cross section.

4. The optical head device according to claim 3, wherein the sum of a saw tooth angle defined between said saw-teeth and said surface, plus said inclination angle, is 45°.

5. The optical head device according to claim 1, wherein said reflecting diffraction grating is formed on a slope of a triangle prism optical element which has the angle of an apex corresponding to said inclination angle.

6. The optical head device according to claim 1, wherein said reflecting diffraction grating is formed on a flat-plate-like optical substrate.

7. The optical head device according to claim 6, wherein of the surfaces of said flat-plate-like substrate, there is a chamfered surface which is opposite the surface having said reflecting diffraction grating for receiving an incident light beam and which is located remote from said convergent optical element, whereby the distance between the lower part of said flat-shaped substrate and said convergent optical element is optically minimized.

8. The optical head device according to claim 1, wherein the locus of the fringes of the grating elements of said reflecting diffraction grating constitutes an interference fringe pattern which is generated by said light beam incident to the grating and said light beam deflected by the grating.

9. The optical head device according to claim 8, wherein said light beam incident to said reflecting diffraction grating and said deflected light beam are both parallel ones.

10. The optical head device according to claim 8, wherein said incident light beam and said deflected light beam are both divergent ones.

11. The optical head device according to claim 1, wherein said first optical means includes a collimator lens means to make the light beam from said semiconductor laser beam source in parallel; the shape of said collimeter lens which is taken along the plane perpendicular to the optical axis of the light beam entering into said convergent optical element is oval, and the direction along the shorter axis of the oval shape is coincident with the forwarding direction of said deflected light beam.

12. The optical head device according to claim 1, wherein said first optical means includes a beam splitter which is formed by bonding two triangle prism elements, in which the length of a side along the forwarding direction of said deflected light beam of said beam splitter is smaller than any of the other sides.

13. The optical head device according to claim 1, wherein the shorter axis of the far-field pattern of the divergent beam emitted from the semiconductor laser is coincident with the forwarding direction of said deflected light beam.

14. The optical head device according to claim 1, wherein said inclination angle is about 18.435°.

15. The optical head device according to claim 4, wherein said inclination angle is about 18,435° and said saw tooth angle is about 26.565°.

16. The optical head device according to claim 11, wherein the proportion of the longer axis to the shorter axis of said oval collimator lens is about 3:1.

17. The optical head device according to claim 8, wherein said incident light beam entering into said reflecting diffraction grating is a divergent beam, and said deflected light beam is a parallel beam.

18. The optical head device according to claim 11, wherein the shorter axis of the far-field pattern of the divergent beam emitted from said semiconductor laser beam source is coincident with the forwarding direction of said deflected light beam.

19. The optical head device according to claim 12, wherein the shorter axis of the far-field pattern of the divergent beam emitted from said semiconductor laser beam source is coincident with the forwarding direction of said deflected light beam.

* * * * *